Sven G V. Stenudd
By Darby & Darby
ATTORNEYS

March 1, 1960 S. G. V. STENUDD 2,927,227

ELECTRODYNAMIC DRIVING DEVICES AND RECORDING
APPARATUS INCORPORATING SUCH DEVICES

Filed May 15, 1956 3 Sheets-Sheet 2

Sven G V. Stenudd

By Darby & Darby

ATTORNEYS

Sven G.V. Stenudd

By Darby + Darby

ATTORNEYS

United States Patent Office 2,927,227

Patented Mar. 1, 1960

2,927,227

ELECTRODYNAMIC DRIVING DEVICES AND RECORDING APPARATUS INCORPORATING SUCH DEVICES

Sven Gunnar Valter Stenudd, Stuvsta, Sweden, assignor to Aktiebolaget Atvidabergs Industrier, Atvidaberg, Sweden Application May 15, 1956, Serial No. 585,093

Claims priority, application Sweden May 16, 1955

8 Claims. (Cl. 310—25)

The present invention is concerned with electrodynamic driving devices equipped with electromagnets or permanent magnets, and in particular with such devices that are required to produce an appreciable mechanical force and are therefore not merely intended for such purposes as indication. Electrodynamic driving devices have several advantages over those of electromechanical type, especially as regards their higher efficiency and constancy of the force produced throughout the stroke. It is possible, moreover, to work with a very narrow and constant air gap in the magnetic circuit, thus making it easy to achieve a large flux and high flux density.

The efficiency, in particular, is of major importance in equipment that has to produce appreciable mechanical force and work, that is, large force and/or long stroke. Although the power loss associated with low efficiency is not usually of any great practical importance in itself, the accompanying generation of heat can cause considerable trouble. Even small electrodynamic driving devices can usually be made with an efficiency of more than 1–10%. At electrical and mechanical resonance the efficiency can be increased to much higher values—up to 60%, and to more than 90% in an arrangement according to the invention. An increase in efficiency from 60 to 90% means that the losses, and thus the amount of heat generated, is reduced by ¾. The moving mass, and thus the inertia of the driving device, can then also be reduced by a corresponding amount.

The majority of electrodynamic driving devices known at present make use of coils in order to eliminate the need for heavy operating currents. However, coils have the following disadvantages. The bulk factor, that is, the ratio between effective conductor volume and total air gap volume is low, one result of which is that the gap for the coil in the magnetic circuit must be increased, leading to a reduction in efficiency and an increase in the moving mass. The magnetic flux density will be rather low with the coil sizes that can be used in practice: if high flux density is to be obtained, the cross-sectional area of the iron in the magnetic circuit must be considerably greater than the effective gap area, and thus the coil should have as large a radius as possible in proportion to its length. This means that the coil will have low mechanical strength and the coil cage must be made of light material in order to keep weight down. The electrical load that can be sustained by a coil is rather low because of the comparatively poor heat conduction and the limitations on the ability of the necessary insulation to withstand heat. A driving device using a coil will be bulky. To summarize, the use of a coil implies: low efficiency, high mechanical and electrical inertia (mass and time constant), low power per unit volume because of poor heat conduction, and, possibly, difficulties resulting from space limitations.

If coils of one turn or less, e.g. strip- or bar-shaped conductors, are used instead of multi-turn coils then the above-mentioned disadvantages will no longer be present, and the same amount of mechanical power can be obtained with the expenditure of less electrical energy. In this case, however, it is necessary to work with high currents and correspondingly low voltages in said conductor, which usually constitutes not more than one turn of a coil (conducting ring or disk) and less than one turn in general. The conductor need not then be insulated, or it may readily be insulated with heat-resistant material. Thus it can withstand a considerably higher temperature and, as a consequence, carry an appreciably greater electrical current density than a coil wound with insulated wire. At the same time, such a conductor will stand up to much higher mechanical stresses than a coil. Since the use of a single conductor presupposes the use of a heavy operating current and, at the same time, a very low operating voltage, there will be no risk of flashover along the conductor or between the conductor and the walls of the magnet gap. Even direct metallic contact with the walls of the gap will have no appreciable importance, since only a small percentage of the operating current in the conductor will be able to overcome the contact resistance at the point of contact and the electrical resistance of the iron in the magnetic circuit. Moreover, leakage of current at such a low voltage will not be dangerous to anyone touching the apparatus nor to any of the components employed in it.

There are known devices, e.g., string galvanometers, in which the moving element consists of straight or almost straight conductors. There have also been earlier proposals for loudspeakers using a strip member. Fig. 1*a* shows the essentials of such a device. Between two magnet poles 8 (N and S) on an electromagnet or permanent magnet there is a very thin corrugated metal strip 1 which oscillates in the direction of the double arrow so as to generate sound when the audiofrequency current to be reproduced is passed through it. It is immediately apparent that a high magnetic flux in the gap between N and S can only be produced with great difficulty and by using large magnets, and that the efficiency will be low. If, on the other hand, the strip is arranged on edge as shown in Fig. 1*b*, then it cannot oscillate in the direction of the double arrow without twisting severely or buckling, and the mechanical guidance of the strip is quite unsatisfactory. Quite apart from the fact that the strip cannot produce any appreciable sound in this arrangement, it is apparent that the device is intrinsically unsuitable, even if it were intended for other driving purposes or merely as an indicating device.

In almost all electrodynamic driving devices the mechanical guidance of and electrical input to the moving element (coil or the like) present considerable difficulties especially if appreciable force is to be produced. The air gap in the magnetic circuit must be as small as possible, and therefore the driving element must have accurate mechanical guidance. The mechanical losses in the form of friction in the guides must be small, all wear must be kept to a minimum and the moving mass must be as low as possible. The electrical input to the driving element is another important problem since, with windings of at most one turn, the current will often be very heavy—currents of several hundred amperes are not uncommon The driving element and also its connections must then have as little inductance as possible. Skin effect in the conductors may also be an important factor, as it tends to increase inductance and resistance. Both the mechanical guides and the feed connections must have high mechanical strength, and high fatigue strength in particular, and they must not increase the moving mass of the driving element more than is absolutely necessary.

The present invention enables the above disadvantages to be largely or completely avoided, and also offers further advantages over presently known devices, especially if the device is intended to produce a comparatively large mechanical force.

Devices according to the invention can therefore be used for many different purposes, in particular for recording equipment, e.g., hole punches, in statistical and computing machines, for diaphragm pumps, electrodynamic relays, type-operating devices, e.g., in teleprinters and computing machines, vibrators, indicating and measuring instruments of recording type, valve and throttle operating devices, blinkers, and many other applications.

The invention will now be described with the aid of a number of examples as shown on the accompanying drawing.

Figs. 1*a* and 1*b* show the principle of an electrodynamic driving device with a moving element which is not in the form of a coil but consists of a straight conductor in a magnetic field, the arrangement as shown in Fig. 1*a* being previously known.

Figs. 2 to 5 each show an example of the driving element in a driving device according to the invention.

Figure 9:
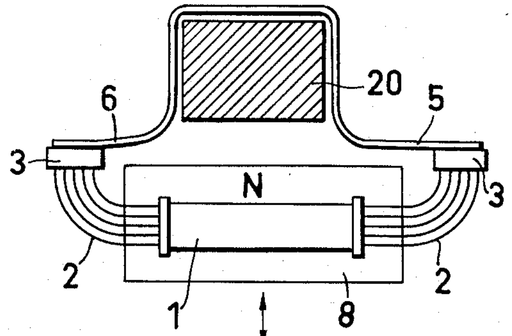
Figure 10:
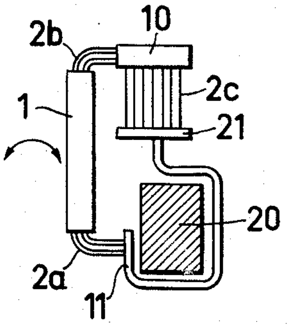

Figs. 9 and 10 each show a driving device with an operating-current transformer.

Figure 11:
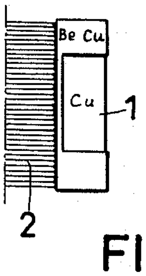

Fig. 11 shows a combined conductor and its connection with a multi-leaf spring.

Figure 12:
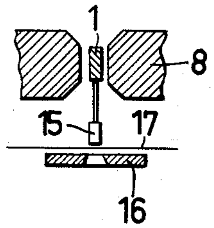

Fig. 12 is a diagrammatic cross section of a driving device for a hole punch.

Figure 14:
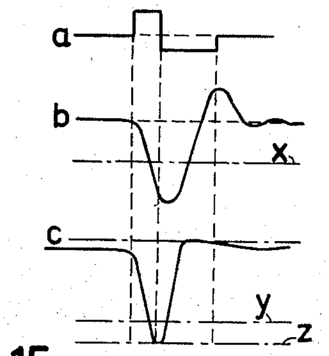
Figure 13:
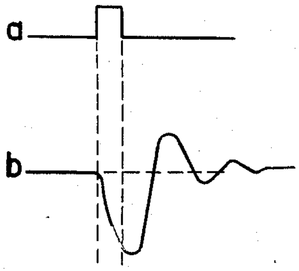

Figs. 13 and 14 are graphs showing electrical driving impulses and corresponding motions of the driving device.

Figure 15:
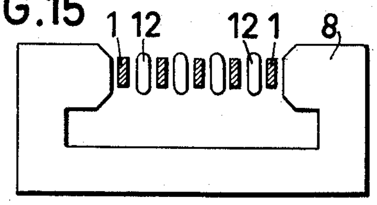
Figure 17:
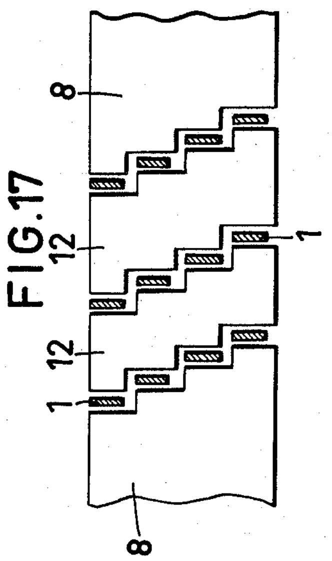
Figure 16:
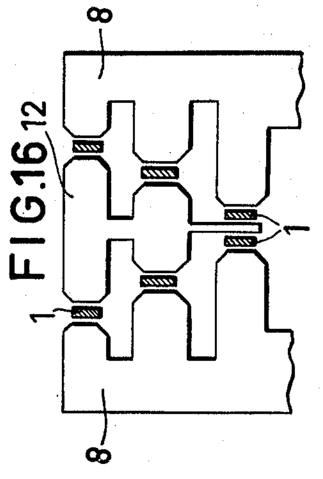

Figs. 15 to 17 each show driving devices for a recording device which includes several hole punches or the like.

Figure 18:
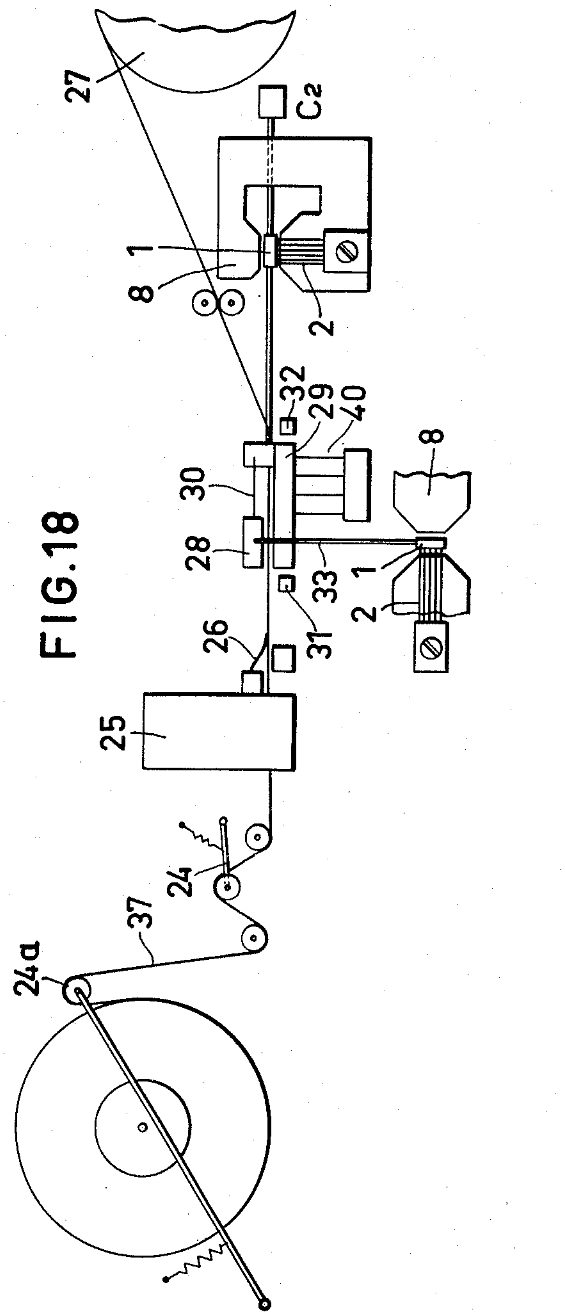

Fig. 18 diagrammatically illustrates a device for rapid step-wise tape feed.

In all the devices described below, the moving element, that is, the conductor 1 arranged in a magnetic field, takes the form of a straight or almost straight bar. Special note should be taken of the fact that this conductor can just as well consist of a round or rectangular tube, a rod, a profiled bar (e.g., U, I or H profile), but may also be a ring, a semicircular conductor, a disk or the like.

Figures 1A, 1B, 2, 3A, 3B, 4, 5, 6:
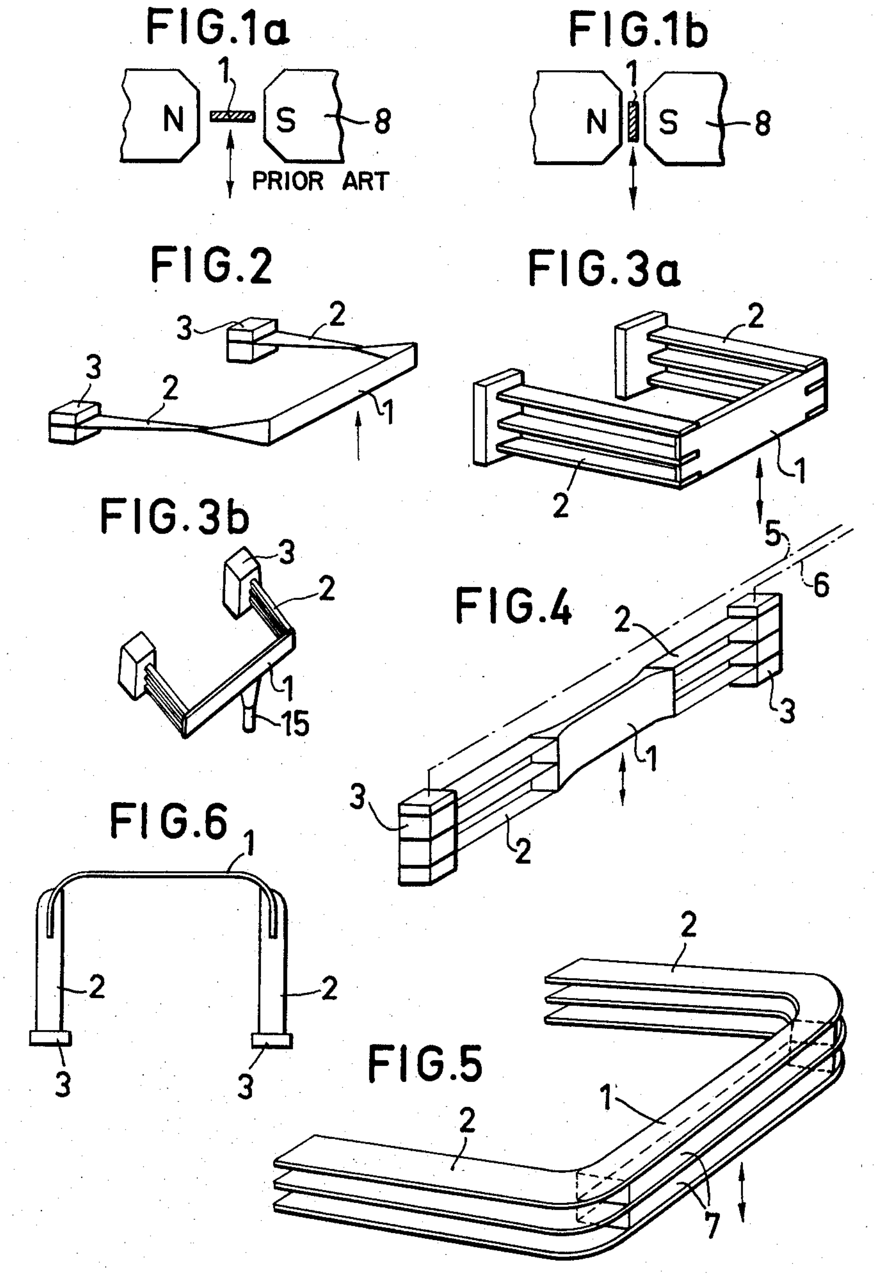
Fig. 6 shows an example of the connection between the moving element and its electrical connections which are in the form of mechanical guides.

Fig. 2 shows a driving element which can suitably consist of beryllium-copper strip bent into the form of a bail, where shanks 2 which act as leaf springs are twisted through 90° and have their ends attached to fixtures 3 which are also the electrical terminals of the driving element. The leaf springs 2 act as both electrical connections and mechanical guides for the moving element, namely conductor 1. Thus conductor 1 can only be displaced at right angles to the planes of the bail, moving along a very small part of a circular arc. If this bail is considered as being arranged with conductor 1 between two magnetic poles 8 as shown in Fig. 1*b*, then for short strokes the circular motion can be neglected in practice, that is, the motion can be assumed linear. Since conductor 1 and springs 2 have the same cross-sectional area and consist of the same material, it is apparent that springs 2 can readily be loaded with the same current as conductor 1. In practice they can sustain a heavier current on account of their better cooling, and thus conductor 1 can be coated with electrolytic copper to increase its area and thus reduce its resistance. If springs 2 are made of, say, spring steel and thus are not integral with conductor 1, then it is suitable to arrange, say, parallel with them, additional connections in the form of copper braid or strips of copper fabric (not shown), so that only part of the total current passes through springs 2, while the rest (the greater part) passes through these additional connections. Alternatively, the entire bail 1, 2 can consist of steel, in which case the portion 1 can suitably be coated with a comparatively thick layer of copper or silver, say, in the form of a welded-on strip of copper or silver. If the steel in part 1 is capable of being permanently magnetized, then its permeability should preferably be low, but this matter is not usually of any great importance.

Fig. 3*a* shows a device similar to that in Fig. 2 but here conductor 1 is connected at both ends to several leaf springs 2 which act as mechanical guides and are intended as electrical connections. Only three such leaf springs are shown at each end of the conductor in the figure. In practice it is often suitable to use a multitude of springs close to each other as shown in Fig. 3*b*. The device shown in Fig. 3*a* has this advantage over that in Fig. 2, that conductor 1 does not move along a circular path, its motion being instead almost completely linear (actually a very slight cosine curve).

Fig. 4 shows a conductor 1 with resilient leaf springs 2 intended as electrical connections, said springs being approximately aligned with the conductor. In this case conductor 1 has completely linear motion. Since springs 2 and their fixtures 3 are in line with conductor 1, they will have a snap action, which is often desirable. The arrangement has two stable operating positions: it can be moved to one position by a positive operating pulse and to the other by a negative pulse, like, say, polarized electromagnetic relays or certain bimetal relays with snap-action elements. If snap action is not desired, the springs may be slightly corrugated. The ends of the conductor may be somewhat widened to permit better fixing of the leaf springs and, in particular, to give a better current distribution at these fixings. Often, however, it is suitable to make conductor 1 of the same width as springs 2, especially if not only conductor 1 but also springs 2, or the greater part of them, are disposed in the magnetic field, because such an arrangement increases the efficiency. The chain lines 5, 6 show how the outer connections of the driving element 1, 2 can be placed so as to reduce the inductance. Since connection 5 is parallel to and close to the driving element 1, 2, it approximates, together with the driving element, a bifilar loop with extremely low inductance.

Fig. 5 shows a driving element where the guiding springs 2 are stamped in the form of a bail. For obvious reasons it is suitable to use at least two bails in parallel, both electrically and mechanically, said bails being connected together either directly (e.g., by being riveted or welded together along the parts 1 intended to be arranged in the magnetic field), or by being fitted with spacers 7 of material with high electrical conductivity between these parts. This arrangement gives a very uniform current distribution in the whole driving element, and thus less inductance than in the arrangements shown in Figs. 2 and 3*a*, for instance.

Fig. 6 shows how conductor 1 and springs 2 can be connected together in such driving elements not being shaped in one piece. Springs 2 are attached to fixtures 3 at one end, the other end being slotted. Conductor 1 is bent in the form of a bail or semi-circle or the like, and its ends are inserted into and soldered or welded to the slotted ends of the springs.

Figure 7:
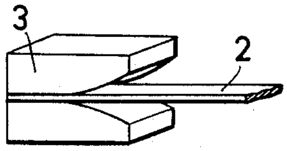
Fig. 7 shows the mechanical attachment of these connections.

In all the devices described here the fixtures 3 for leaf springs 2 can be shaped as shown in Fig. 7. Such fixtures are already known and need not therefore be described in detail here. They result in the outermost point of contact of the spring in the fixture moving along the spring as the amplitude of the spring deflection increases. Moreover, such a fixture does not give rise to fatigue failure since it does not prevent elastic changes in length in the actual body of the spring. Usually more than one leaf spring 2 is used at each end of conductor 1. This does not mean that separate spring fixtures 3 as shown in Fig. 7 are required for every spring; instead sets consisting of one or more springs 2 can be inserted into a single fixture, possibly with resilient packings between the fixed ends of the springs to act as spacers and prevent friction between the springs when they move.

Figure 8:
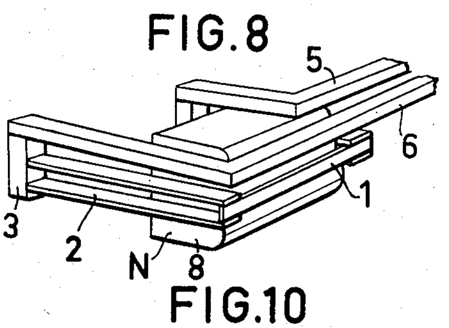
Fig. 8 shows part of such a guiding connection and its outer connection leads.

Fig. 8 shows how a device in accordance with Fig. 3*a*, for instance, is connected to its source of operating current, that is, to the source feeding conductor 1. The feed connections 5, 6 are so arranged that they run as close and parallel as possible to one another and to conductor 1 and springs 2. The inductance of the arrangement will then be very low. The magnet pole N of the driving device (located inside the driving element 1, 2) is shown in the figure. Since the end of the magnet pole is almost always heavily chamfered so that the area of the effective air gap is much less than the maximum area of the magnet pole, two V-shaped spaces are formed between the poles, see Fig. 1*b*. At least one of the connections 6 can be placed in this space and will thus be very close to conductor 1 and its leaf springs 2.

Fig. 9 shows a driving device in which conductor 1 is connected through curved leaf springs 2 to fixtures 3. Part of the springs is located in the magnet gap and thus also operates as a driving element. The motion of conductor 1 is linear in the direction of the double arrow, and there is no component of the motion at right angles to the plane of the figure. Close beside the driving device there is a transformer 20. The outer connections 5, 6 of the driving device constitute the ends of a secondary with one or a few turns on transformer 20, which supplies the necessary heavy current of some tens or hundreds of amperes. Separate fixtures may be provided at the ends of conductor 1 for attaching springs 2 by welding or soldering.

Fig. 10 shows a driving device in which the driving element performs an oscillating motion in the direction of the double arrow. Conductor 1 is connected by means of curved leaf springs 2*a* at one end to a stationary fixture 11, and at the other end is connected by curved leaf springs 2*b* to a movable fixture 10. This movable fixture 10 is connected by straight flat springs 2*c* to a stationary fixture 21. These fixtures consist of the ends of a single-turn winding of copper strip on transformer 20. The arrangement is such that the inductance and resistance will be very low. All springs 2*a*, 2*b*, 2*c* consist of beryllium-copper, but springs 2*c* are considerably stronger than springs 2*a* and 2*b*. Springs 2*a* can readily be replaced by an ordinary bearing, for instance in the form of a shaft in a bearing bush or a knife-edge in a bearing piece, the principle being the same as that commonly used for the armatures of electromagnetic relays. Where such bearings are used, however, the current to conductor 1 should be supplied through a movable connection in parallel with the bearing, e.g., a multi-strand copper braid. The only purpose of springs 2*b* is to act as frictionless bearings and as flexible electrical connections between conductor 1 and the movable fixture 10 since, as shown on the drawing, the upper end of conductor 1 moves along a circular path of greater radius of curvature than does the fixture 10. Springs 2*b* need not therefore be highly flexible. Springs 2*b*, too, can be replaced by a link or bearing in parallel with which a copper braid or the like is connected.

Springs 2*c* are those which are principally as mechanical guides for conductor 1 and as feed connections therefor. They can be dimensioned so as to give resonance with the whole moving mass at a desired or, possibly, adjustable frequency.

In all driving devices the mechanical force produced is taken directly or indirectly from conductor 1, which must therefore satisfy certain mechanical demands as regards strength, stiffness, etc.

The mechanical demands made on the conductor vary with the field of application and the mechanical force desired. It has been stated above that the conductor can be made in various ways and, in particular, with various profiles, is being possible to reinforce the conductor with steel, beryllium-copper or the like. Taking account of the moving mass, it may be suitable, especially where the mechanical force is small, to make the conductor of light metal, either pure aluminium of high electrical conductivity or a mechanically strong light alloy. The conductor may, for instance, consist of a bar, tube or rod of aluminium, light alloy, beryllium-copper or steel, combined with a high-conductivity part of silver or electrolytic copper. Conductor 1 can thus consist of electrolytic copper in combination with beryllium-copper, as illustrated in Fig. 11, the good electric conductivity and the great mechanical strength being combined for producing the optimum result, or of steel and copper or pure aluminium, of copper and light metal with or without reinforcement of steel or beryllium-copper, or some similar combination, it being possible in all cases to replace the high-conductivity part of conductor 1 wholly or partly with silver.

In the exceptional cases (as yet uncommon) where the superconduction property of certain materials can be utilized, the above-mentioned high-conductivity part of conductor 1 can, of course, consist of such material. This may also apply to the magnetizing winding on the electromagnet (if used) for the driving device.

As mentioned above, it is suitable in many cases to use multi-leaf springs instead of the individual springs 2 shown in most figures. Even in very small driving elements it is preferable to use some hundred tightly packed leaf springs 2, say of beryllium-copper sheet between 0.05 and 0.1 millimetres thick. If both ends of such a set of springs are silvered by dipping them into molten silver and these ends, thickly coated with silver, are pressed against fixture 3 and conductor 1 with application of heat, the resulting connection will be very satisfactory, both mechanically and electrically. Such a connection is shown in Fig. 11. This method does not preclude the possibility of subsequently hardening the beryllium-copper springs in the customary manner.

It is apparent that the above-mentioned principle for feeding and mechanically guiding the driving element is fully capable of being used even where the driving element consists of a metal frame, ring or disk, which constitutes a short-circuited single-turn winding. In such cases a ring-shaped driving element, for instance, can be arranged to serve at the same time as a movable winding on a transformer for feeding the winding, the above-mentioned flat springs then acting only as mechanical guides.

Because of the large total area of springs 2, the heat generated can be conducted to the feed winding, which can readily be arranged to have a large cooling surface. The feed connections can be laid against the iron of the magnetic circuit or the like, with a thin layer of insulation interposed, and the heat thus conducted away. One feed connection can even be connected metallically with this iron, that is, connected to it both electrically and thermically.

Several separate or interconnected driving elements can, of course, be arranged in one and the same magnet gap. Driving devices in accordance with the invention are especially useful in operating equipment for recording apparatus and the present invention also extends to such applications. Thus, as well-known, modern tape- or card-programmed apparatus, such as statistical and calculating machines, teleprinters and machines for high-speed telegraphy operate at very high speeds. When the tape or card is being read it can be fed much more rapidly than is possible when information is being recorded on it. Quite apart from the waste of time this involves, there arises the troublesome necessity of coordinating each machine of this type with a number of recording units if its capacity is to be utilized to the full—a vital consideration in view of the high purchase price and operating costs for such machines.

At present the fastest recording equipment operates at a rate of about 10 characters (marks or groups of marks) per second. These units are fitted with recording devices (pens, hole punches, etc.) with electro-magnetic or mechanical drive. Equipment producing a greater number of marks per second is also available, but in that case each mark does not represent an independent character—instead they are combined in an orderly manner until they form, say, a letter. Proposals have also been put forward for recording by means of electric sparks which produce marks on paper (possibly with a suitable coating) at rates higher than those mentioned above. However, the resulting marks tend to be uneven and are difficult to read with automatic equipment, for which reason spark recording equipment has no practical importance. The only practical high-speed recording equipment employs purely magnetic recording on a tape or drum of material that can be magnetized. But the use of such equipment is restricted for practical reasons to certain technical fields, one of its disadvantages being that the information recorded cannot be checked visually.

However, rapid recording (or reading) necessitates correspondingly rapid feed of the tape or card, which in most causes must also be capable of being started or stopped very quickly. At the same time it is often necessary to start or stop the tape at a very accurately determined instant and position on the tape. It follows that a tape that has, say, been stopped between two successive recordings (or immediately after making the last recording) must be accelerated very rapidly until the next recording is reached and the tape can proceed at normal speed. In many cases the tape must be fed intermittently during recording.

A number of difficult problems, in addition to that of achieving rapid recording, arise in recording by means of hole punching on cards or tape, that is, recording by methods that require a certain amount of force and operation on a number of closely spaced fields. Each hole punch must have its own electrical driving device. At high recording speeds there is an increase in the power consumption both per recording and on the average (integrated power). The electrical driving devices should be arranged as close together as possible in view of the close spacing of the hole punches. This gives rise to considerable difficulties in design and also introduces problems in heat dissipation, placing great importance on the efficiency of the driving equipment. In order to attain high recording speed and high efficiency, the moving masses must be as small as possible. For this reason, too, it is not desirable to have intermediate equipment between the hole punches and driving devices. This applies in particular to the Bowden cables that have previously been in general use and considered necessary because of the close spacing of the hole punches.

The invention makes it possible to record, e.g. by hole punching, more than 20 times as fast as previously and has proved capable of enabling recording to be done at the rate of between 200 and 500 groups of characters (rows of holes) per second. Fig. 12 shows part of a permanent-magnet-dynamic circuit 8 with an air gap in which a rigid conductor 1 (shown end-on) is suspended so that it can move in the vertical direction. The conductor is connected to a hole-punch device 15, 16 for a tape or card 17. Conductor 1 is connected by two leaf springs to two fixed terminals 3 which supply current to conductor (Fig. 2). In Fig. 3*b* the conductor 1 is supported by multi-leaf springs 2.

At the air gap round conductor 1, the common technique of making the pole pieces of the magnetic circuit conical can be used to produce a flux density far above the saturation level of the iron.

In view of the high operating speed desired, conductor 1 should be driven in a suitable manner. Conductor 1 can have absolutely a periodic motion, that is, it is to some extent inexorably excited and does not operate within its range of mechanical resonance. In such cases it is convenient to use a double pulse: one pulse in a certain direction to drive conductor 1 and hole punch 15 downwards, followed by a possibly weaker pulse in the opposite direction which returns conductor 1 to its initial position, possibly with the aid of the spring force. This double pulse is obtained automatically if the terminals are connected to a pulse transformer, especially a premagnetized transformer, fed with single D.C. pulses will produce the required double pulses.

The arrangement can be such that the moving part of the device, e.g. the actual conductor 1 or hole punch 15, strikes a more or less elastic stop and rebounds, after which it strikes another type of stop which is so arranged and/or consists of such material, that the residual kinetic energy of conductor 1 is consumed in this stop by being converted into heat. Such a stop can consist of an electric, hydraulic or pneumatic damper, or simply of suitable material of the same type as lead.

Figs. 13 and 14 show the relationship between the driving current in conductor 1 and the motion as a function of time. Fig. 13 shows the simple case where conductor 1 is driven by a single impulse as shown by curve *a* and then performs a motion as shown by curve *b*. This motion is of oscillatory type, heavily damped by, say, frictional losses (in the air and during punching of the holes). Fig. 14 shows at "*a*" diagrammatically a double pulse of above-mentioned type which should produce a motion as illustrated at "*b*." By employing the methods mentioned above, e.g. spring stops producing damping, a motion of the type shown at "*c*" will be obtained. It is obvious that this motion ceases much earlier than that shown at "*b*," and that the driving device can therefore operate with a much higher punching frequency when the motion is of the type shown at "*c*." *x* and *y* denote punching levels and *z* rebound level.

According to the invention, several devices with bar-shaped conductors as shown in Fig. 12 can be combined with one another for simultaneous punching of several holes. A single permanent magnet can then be used for several devices, e.g. as shown in Figs. 15 to 17.

Fig. 15 shows diagrammatically a driving device for five hole punches which can operate independently of one another. Five conductors 1 and four intermediate pieces 12 of iron or permanent-magnetic material are inserted in the air gap of the magnet 8. Each conductor 1 is arranged and connected in the way described above, for instance, but one terminal can be common to all the conductors 1. It is apparent that the five conductors 1 can be arranged very close together, since the intermediate pieces 12, which retain the lines of flux in the relatively wide total air gap in magnet 8, can be quite thin. If the conductors 1 are very close together it may be impossible to arrange the hole punches parallel to one another in the same plane. They may therefore be displaced relative to one another or arranged in an arc so that they are directed radially towards a transversely curved recording tape or the like. It is also possible to arrange the conductors 1 and intermediate pieces 12 between the pole pieces in such a way the line through the middle points of the conductors and intermediate pieces forms a slightly curved circular arc between the pole pieces.

As shown in Figs. 16 and 17, the conductors 1 can be arranged very close together in the direction of the line joining the pole pieces if the intermediate pieces 12 are made in a certain way.

Fig. 16 thus shows an arrangement with six conductors 1 which can be operated independently of one another and which lie in the air gap between the pole pieces of the magnetic circuit 8 and a single intermediate piece 12. It shoud be apparent that the shapes of the pole pieces and intermediate piece as shown in Fig. 16 are intended to reduce the leakage field of the magnetic field to a minimum. Fig. 17 shows a similar arrangement for twelve conductors 1 between two pole pieces 8 on a magnet and two intermediate pieces 12. Since the conductors 1 are displaced in relation to one another as shown in Figs. 16 and 17, they can be arranged in the smallest possible space, and thus operating rods or the like for hole punches or the like can be arranged close together either in one and the same plane or in different planes.

The arrangements shown in Figs. 15 to 17 differ in principle in that the magnetic fields driving the individual conductors 1 are connected in series in Fig. 15 but series-connected in groups in Figs. 16 and 17, where the individual conductors in each group are connected in parallel with one another. For instance, considering the first four conductors 1 (counting from the left) in Fig. 17, it will be seen that the magnetic fields driving them between reference numerals 8 and 12 are connected in parallel.

Pure series connection of the magnetic fields as shown in Fig. 15 does, admittedly, mean that a considerably lower total flux is required than with parallel connection, but nevertheless it is generally less suitable because the magnetic leakage will be fairly high and therefore the maximum possible flux cannot be obtained for each conductor, resulting in lower efficiency of the driving device. In certain special cases, particularly where only a few conductors 1, that is, only a few hole punches, are required, this arrangement may however be suitable for structural or other practical reasons. As a principle, however, parallel magnetic fields are preferable.

It is unnecessary in this context to give an exhaustive description of all the usable variants of devices in accordance with the invention. Moreover the above description is almost exclusively devoted to hole punching, that is, to the type of recording most likely to present difficulties when vary rapid recording is required. Devices in accordance with the invention can, of course, be used with advantages for types of recording and forward-feed mechanisms other than those shown above. In recording by writing or printing (using pens or type), recording in certain cases can be done on continuously moving tape and with less movement of the recording device towards the paper than in hole punching.

For instance, devices in accordance with the invention can also be used for teleprinters and high-speed telegraphy systems both in conjunction with coded recording and for operating the actual type-bars. The invention can, for example, be used together with the so-called Anelex system, where a row of hammers are arranged along a line of printing, the spacing between them corresponding to the spacing between printed characters along the line. On the other side of the printing paper there is a rotating type wheel against which the hammers strike the paper at the instant when the correct type on the wheel is opposite the hammer. The relatively numerous hammers, in number equal to the greatest number of characters in a line (normally 60 to 100 characters per line), can then be driven simply and efficiently by means of, say, a device as shown in Fig. 17, where the conductors 1 can be arranged sufficiently close together along the line.

Fig. 18 shows a recording tape 37 which is fed over a pivoted roller arrangement of familiar type, 24*a*, for smoothing out jerks, and which passes through a recording device 25, for instance of the type covered by the invention, and a band brake 26, to a take-up spool 27. This spool 27 is driven by known means through a safety clutch (not shown). Band brake 26 is set so that the braking force is normally sufficient to keep the tape stationary and thus makes the said clutch slip. The tape 37 is fed through the space between a flap 28, which can move up and down and sideways, and a support 29 which can move only sideways. (In this context sideways movement means movement only along the length of the tape.) Flap 28 and support 29 can suitably be coupled together in such a way that they can move relative to each other only in the direction towards and away from the tape. The movement of flap 28 and support 29 along the length of the tape is limited by two stops 31, 32, which can be arranged so as to satisfy the requirements as regards elasticity and damping. In addition, one or both of the stops can be arranged as or work together with electric contacts. Flap 28 and support 29 are spring-loaded by means of a return spring 30 so that normally they are always in one of their end positions. Below support 29 (alternatively above flap 28) there is a driving device of the type described previously, that is, a powerful magnet 8 and an electrodynamically actuated conductor 1 which is connected, by one or more flexible wires 33, strips or link rods, to flap 28, which is pulls downwards towards strip 37 on to support 29 and holds the strip against the support when current is passed through conductor 1 in a certain direction. Conductor 1 is returned to its position of rest by means of spring 2. There is also a second driving device of similar type which is coupled to the unit 28, 29 consisting of flap and support so as to move this unit along the length of the band between stops 31, 32.

The arrangement shown in Fig. 18 operates as follows. The tape 37 is held taut between spool 27 or a separate driving roller, to which torque is applied through a slipping clutch and the brake band 26. When a current pulse is passed through conductors 1 in the both driving devices mentioned above, flap 28 is pulled towards the tape 37 which lies on support 29. At the same time, unit 28, 29 is pulled away from stop 31 and towards stop 32 in the forward-feed direction of the tape, taking the tape with it. At this instant or immediately afterwards the current is broken, flap 28 releases the tape and is returned together with support 29 to stop 31 by means of spring 30. Because the tape is still held taut, it is prevented from being pulled back by friction against 28 or 29. The tape has thus been fed forward one step. It is apparent from the foregoing that the driving device for the up-and-down movement of flap 28, that is, the operating device for retaining the tape, need have a stroke of only a fraction of a millimetre. In fact, when paper tape or film is used, a stroke of a few hundredths of a millimetre or even less may suffice. Particularly when coated paper or film is used or when recording is done by means of ink which may be liable to smudge because it does not dry instantly, flap 28 and possibly also support 29 are made with such contact surfaces that they do not touch the parts of the tape intended for recording (or on which recordings have been made). This can be achieved by arranging for the tape to be gripped at, say, one or both edges or a central section along the length of the tape.

The other driving device for forward feed must usually have a considerably longer stroke. In connection with hole punching the stroke may have to be several millimetres, and for film feed about one centimetre. This driving device can suitably be arranged to operate with a stroke frequency equal to the mechanical resonant frequency of the device, which can be adjusted (even during operation) in various known ways, e.g., by altering the tension of a spring and the mass of the moving part. In such a case the driving device can suitably be controlled by some kind of automatic amplitude regulator. A capacitor C2 can be used for this purpose, driving conductor 1 through an amplifying circuit or a pulse generator synchronized by the capacitor, so that the driving device goes into oscillation and stops 31, 32 can be dispensed with. On the other hand it is most suitable to drive flap 28 aperiodically. In addition the previously mentioned problem of stopping or starting the tape instantaneously and at a certain point on the tape arises in connection with recording on or reading continuously moving tape or cards. For instance, when a reading has been made, the tape must usually be stopped so rapidly that the next recording has not time to pass the reading device and thus be neglected. A driving device in accordance with the invention can therefore be fitted with a suitable arrangement for arresting a tape during feed extremely rapidly and precisely and/or for starting the tape feed extremely rapidly and precisely.

A device similar to that consisting of 4, 8, 1, 28, 29, 33 as shown in Fig. 18 can be used as a rapid-action band brake. In this case flap 28 and support 29 cannot move along the length of the tape, or have only a light, resilient movement in that direction so as to minimize the jerk when the tape is clamped between them. The jerk can also or alternatively be taken up by the pivoted-roller arrangement **24*a***.

A device for rapidly starting a tape can be made in a similar manner if support 29 is replaced by a roller which is not driven but is free to rotate, and flap 28 by a continuously driven rotating driving roller or vice versa. The flap arrangement shown in Fig. 18 can, however, also be used directly as a starting device, in which case it makes only one single movement, or a few movements, along the length of the tape when an independent driving device (e.g. over spool 27) is connected, the initial inertia being considerably reduced by the flap arrangement 28, 29 starting and accelerating the tape at the same time, say until it has reached approximately its normal running speed.

In the arrangement as shown in Fig. 18 the stop 32 can be fitted with or work in conjunction with a breaker contact which breaks the current through conductor 1 before the current pulse through the conductor ceases. Especially, if automatic self-feed is desired, the contacts at stops 31, 32 (which need not be galvanic contacts but may be, say, magnetic or photo-electric), can be connected to an electronic switching circuit for making and breaking the circuit through conductor 1. This permits extremely rapid automatic forward feed of the tape, the number of feed steps per second being equal to the mechanical resonant frequency of the driving device. Alternatively, the electronic switching circuit can be of self-oscillating type, synchronized by means of these contacts of by means of one such contact. An arrangement of the type shown in Fig. 18 can, of course, be synchronized directly or indirectly and by mechanical or electrical means with a recording device or other device, e.g. the time-pulse generator in a calculating machine. Conductor 1 can also be fed from a pulse generator or A.C. source, possibly of a frequency that can be varied and synchronized.

I claim:

1. A driving device of electrodynamic type and in particular of permanent-magnet dynamic type for an operating or a recording device with a number of recording units, each such unit being provided with a driving unit so that several recordings can be made simultaneously, wherein a plurality of conductors in the form of single conductors having a relatively small dimension parallel to the magnetic flux lines and a large dimension perpendicular to the magnetic flux lines and capable of being operated independently of one another extend parallel to each other in the same magnetic field each said conductor being mounted for movement in a plane parallel to the magnetic lines of flux and perpendicular to the axis of the conductor and each conductor serving to operate a recording unit.

2. A device according to claim 1, characterized by several conductors being arranged within one and the same air gap.

3. A device according to claim 2, characterized by the conductors being mounted for movement within the same air gap said conductors being interspersed with strips of magnetically permeable material forming a plurality of magnetic gaps the number of which is equal to the number of conductors, said gaps being arranged in series with one another in the magnetic circuit.

4. A device according to claim 2, characterized by the conductors being provided with movable electric connections of highly conductive non-resilient material, combined with steel springs.

5. In an electrodynamic driving device of the type having a current carrying conductor mounted for movement in a magnetic gap, the improvement which comprises forming the conductor as a coil of at most one turn, said conductor having a cross-sectional shape with a relatively small dimension parallel to the magnetic flux lines across the gap and a relatively large dimension perpendicular to the flux lines and supporting said conductor by means of a pair of leaf springs, each of which is bent and twisted approximately 90° outside of the magnetic gap and each of which is attached to a mechanical fixture arranged as an electrical terminal, said springs guiding said conductor for substantially linear movement in the magnetic gap, said movement being in a plane including the axis of said conductor, said plane also being perpendicular to the lines of magnetic flux.

6. The device of claim 1 wherein said magnetic field exists across a plurality of air gaps formed by stepped pole pieces of matching configuration.

7. A device according to claim 5 characterized by the provision of connections for feeding current to said movable current carrying conductor, one said connection extending along the greater part of the conductor and of the leaf spring at one side thereof so as to reduce the inductance.

8. A device according to claim 5 characterized by the leaf springs being arranged with at least part of their length in the magnetic gap.

References Cited in the file of this patent

UNITED STATES PATENTS

| | | |
|---|---|---|
| 1,386,834 | Beckert | Aug. 9, 1921 |
| 1,866,361 | Kuehni | July 5, 1932 |
| 1,916,162 | Parker | June 27, 1933 |
| 2,753,176 | List | July 3, 1956 |